United States Patent
Wiencke et al.

(10) Patent No.: US 11,868,780 B2
(45) Date of Patent: Jan. 9, 2024

(54) CENTRAL PROCESSOR-COPROCESSOR SYNCHRONIZATION

(71) Applicant: TEXAS INSTRUMENTS INCORPORATED, Dallas, TX (US)

(72) Inventors: Christian Wiencke, Garching (DE); Armin Stingl, Munich (DE); Jeroen Vliegen, Fahrenzhausen (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 21 days.

(21) Appl. No.: 17/412,491

(22) Filed: Aug. 26, 2021

(65) Prior Publication Data

US 2021/0382721 A1    Dec. 9, 2021

Related U.S. Application Data

(63) Continuation of application No. 14/459,416, filed on Aug. 14, 2014, now Pat. No. 11,132,203.

(51) Int. Cl.
*G06F 9/22* (2006.01)
*G06F 9/38* (2018.01)

(52) U.S. Cl.
CPC .......... *G06F 9/3838* (2013.01); *G06F 9/3877* (2013.01)

(58) Field of Classification Search
CPC ........ G06F 9/3838; G06F 9/3877; G06F 9/38; G06F 9/52; G06F 9/3836; G06F 9/4881; G06F 9/3009; G06F 9/3885; G06F 9/3881; G06F 15/76; G06F 11/0724
See application file for complete search history.

(56) References Cited

U.S. PATENT DOCUMENTS

| | | | | |
|---|---|---|---|---|
| 5,062,041 A | * | 10/1991 | Zuk | G06F 9/30181 712/34 |
| 5,488,729 A | * | 1/1996 | Vegesna | G06F 9/384 712/E9.027 |
| 5,909,565 A | * | 6/1999 | Morikawa | G06F 9/3877 712/200 |
| 7,539,847 B2 | * | 5/2009 | Kashiwagi | G06F 9/3877 713/400 |
| 9,443,279 B2 | * | 9/2016 | Ye | G06F 3/14 |

(Continued)

OTHER PUBLICATIONS

Hennessy; Computer Architecture: A Quantitative Approach; 3rd Edition; May 15, 2022; p. 481 (Year: 2002).*

(Continued)

*Primary Examiner* — Cheng Yuan Tseng
(74) *Attorney, Agent, or Firm* — Brian D. Graham; Frank D. Cimino

(57) ABSTRACT

An electronic device that includes a central processor and a coprocessor coupled to the central processor. The central processor includes a plurality of registers and is configured to decode a first set of instructions. The first set of instructions includes a command instruction and an identity of a destination register. The coprocessor is configured to receive the command instruction from the central processor, execute the command instruction, and write a result of the command instruction in the destination register. The central processor is further configured to set a register tag for the destination register at the time the central processor decodes the first set of instructions and to clear the register tag at the time the result is written in the destination register.

20 Claims, 2 Drawing Sheets

(56) References Cited

U.S. PATENT DOCUMENTS

| | | | | |
|---|---|---|---|---|
| 9,846,673 | B2* | 12/2017 | Kasahara | G06F 15/76 |
| 11,327,813 | B2* | 5/2022 | Manula | G06F 9/52 |
| 2001/0042193 | A1* | 11/2001 | Fleck | G06F 9/3877 |
| | | | | 712/220 |
| 2003/0033506 | A1* | 2/2003 | Hinds | G06F 9/3861 |
| | | | | 712/217 |
| 2003/0135713 | A1* | 7/2003 | Rychlik | G06F 9/3013 |
| | | | | 712/E9.05 |
| 2003/0169259 | A1* | 9/2003 | Lavelle | G06T 15/005 |
| | | | | 345/582 |
| 2004/0044878 | A1* | 3/2004 | Evans | G06F 9/3842 |
| | | | | 712/E9.05 |
| 2005/0071518 | A1* | 3/2005 | Samra | G06F 9/384 |
| | | | | 710/1 |
| 2014/0006757 | A1* | 1/2014 | Assarpour | G06F 9/30076 |
| | | | | 712/226 |
| 2016/0048396 | A1* | 2/2016 | Wiencke | G06F 9/3838 |
| | | | | 712/34 |
| 2021/0382721 | A1* | 12/2021 | Wiencke | G06F 9/3836 |
| 2023/0119235 | A1* | 4/2023 | Hutton | G06F 11/3495 |
| | | | | 713/503 |

OTHER PUBLICATIONS

Hennessy; Computer Architecture: A Quantitative Approach; 3rd Edition; May 15, 2002, p. 481.

* cited by examiner

CENTRAL PROCESSOR-COPROCESSOR SYNCHRONIZATION

CROSS-REFERENCE TO RELATED APPLICATION

This application is a continuation of U.S. application Ser. No. 14/459,416 filed Aug. 14, 2014 now U. S. Pat. No. 11,132,203), the entirety of which is incorporated herein by reference.

BACKGROUND

A central processor may dedicate tasks to specialized coprocessors for execution. Such tasks may include signal processing, encryption, input/output (I/O) interfacing with peripheral devices, floating point arithmetic, string processing, etc. While the coprocessors execute their assigned tasks, the central processor may execute other tasks, so long as those tasks do not depend on the tasks being executed by the coprocessors. If any task being executed by the central processor does require the result of any one of the tasks being performed by the coprocessors, the execution by the central processor of that task needs to wait until the result from the coprocessor is ready. Thus, synchronization between the central processor and the coprocessors is needed.

Two types of central processor-coprocessor synchronization schemes are currently utilized. Both types require software overhead. One central processor-coprocessor synchronization scheme uses polling. In polling, the central processor may continue to execute its task until the result of one of the coprocessor's task is required. At that point, the central processor may poll the status register of the coprocessor to determine if the coprocessor has completed executing its task. Once the status register of the coprocessor indicates it has completed executing its task, the central processor continues to execute its task utilizing the result from the coprocessor.

Another central processor-coprocessor synchronization scheme uses interrupts. In this type of synchronization scheme, the central processor sends the coprocessor instructions to execute and then may enter into a lower power mode at the point that its task requires the result from the coprocessor. Once the coprocessor finishes executing its task, the coprocessor may generate an interrupt to cause the central processor to wake from the low power mode and enter into an interrupt service routine. The interrupt service routine may wake up the central processor's main thread, which requires the result from the coprocessor's task, and allows the central processor to use the result of the task executed by the coprocessor.

SUMMARY

The problems noted above are solved in large part by systems and methods for synchronizing a central processor with one or more coprocessors. In some embodiments, an electronic device includes a central processor and a coprocessor coupled to the central processor. The central processor includes a plurality of registers and is configured to decode a first set of instructions. The first set of instructions includes a command instruction and an identity of a destination register. The coprocessor is configured to receive the command instruction from the central processor, execute the command instruction, and write a result of the command instruction in the destination register. The central processor is further configured to set a register tag for the destination register at the time the central processor decodes the first set of instructions and to clear the register tag at the time the result is written in the destination register.

Another illustrative embodiment includes a method that comprises decoding, by a central processor, a first set of instructions comprising a command instruction and an identity of a destination register in the central processor. The method also includes setting, by the central processor, a register tag for the destination register at the time of the decoding. The method continues with sending, by the central processor, the command instruction and the identity of the destination register to a coprocessor. The method also includes executing, by the coprocessor the command instruction. The method continues with writing the result of the command instruction into the destination register. The method also includes clearing the register tag at the time of the writing the result.

Yet another illustrative embodiment is a central processor including a decode engine, an execution engine, a coprocessor interface, write back logic, and a plurality of registers. The decode engine is configured to decode a first set of instructions and set a register tag for a destination register. The first set of instructions includes a command instruction and the identity of the destination register. The execution engine is configured to execute a second set of instructions. The coprocessor interface is configured to send the command instruction and the destination instruction to a coprocessor and to receive a result of the command instruction from the coprocessor. The write back logic is configured to write the result of the command instruction into the destination register and to clear the register tag once the result of the command instruction is written in the destination register. The destination register is one of the plurality of registers.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
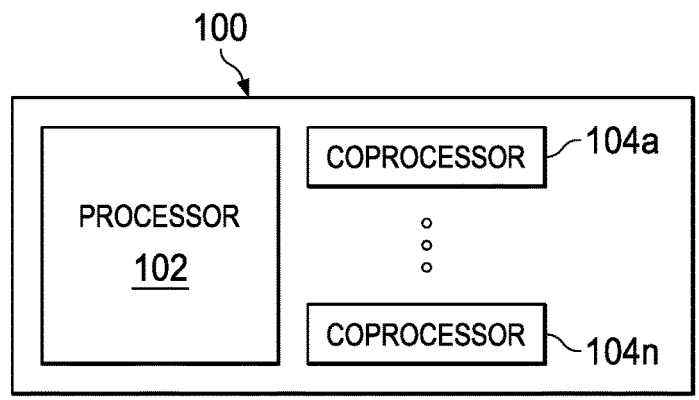
FIG. 1 shows a block diagram of an illustrative electronic device for synchronizing a central processor with one or more coprocessors in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections. Further, the term "software" includes any executable code capable of running on a processor, regardless of the media used to store the software. Thus, code stored in storage (e.g., non-volatile memory), and sometimes referred to as "embedded firmware," is included within the definition of software. The recitation "based on" is intended to mean "based at least in part on." Therefore, if X is based on Y, X may be based on Y and any number of other factors.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The demand for low power, highly efficient solutions in mobile electronic devices, such as microcontrollers, is increasing. Thus, microcontrollers may contain a central processor that is dedicated to executing core tasks of the microcontroller while utilizing specialized coprocessors for execution of other tasks such as signal processing, encryption, input/output (I/O) interfacing with peripheral devices, floating point arithmetic, string processing, etc. While the coprocessors execute their assigned tasks, the central processor may execute other tasks, so long as those tasks do not depend on the tasks being executed by the coprocessors. If any task being executed by the central processor does require the result of any one of the tasks being performed by the coprocessors, the execution by the central processor of that task needs to wait until the result from the coprocessor is ready. Utilizing polling loops and/or interrupt service routines to synchronize the central processor with the coprocessors requires software overhead. Thus, there is a need for a central processor-coprocessor synchronization scheme that does not require software overhead.

A central processor may decode, extract, and send special coprocessor instructions to coprocessors. These specialized coprocessor instructions may include a command instruction as well as an identity of a destination register in the central processor where the result of the executed command instruction is to be written. At the time the special coprocessor instructions are decoded by the central processor, a register tag may be set for the destination register. The register tag indicates that a write back from a coprocessor is pending for that specific destination register. Once the coprocessor finishes executing the command instructions, the result is written into the destination register of the central processor and the register tag is cleared thereby indicating to the central processor that the result of the coprocessor executed instructions has been written into the destination register. While the coprocessor is executing the command instruction, the central processor may continue executing other instructions as long as the tagged destination register is not used (e.g. read from or written to). If the central processor requires usage of the tagged destination register, then the central processor stalls executing its instruction until the result from the coprocessor executed command instruction has been written into the destination register and the tag has been cleared.

In this way, the central processor itself always guarantees correct execution of instructions and usage of its registers. Additionally, the processer will continue to execute instructions while the coprocessor is processing its command instructions as long as the central processor's instructions are independent from the result of the coprocessor command executed instructions. However, if the result of the coprocessor executed command instruction is needed by the central processor for the execution of its instructions, the central processor will automatically stop executing its instructions (i.e. stall) and wait until the results from the coprocessor executed instructions are available.

FIG. 1 shows a block diagram of an illustrative electronic device 100 for synchronizing a central processor 102 with one or more coprocessors 104a-104n in accordance with various embodiments. In an embodiment, electronic device 100 is a microcontroller. The electronic device 100 includes central processor 102 which may be coupled to coprocessors 104a-104n.

Central processor 102 is hardware that may carry out computer instructions by performing, for example, arithmetic, logical, and input/output (I/O) operations for electronic device 100. Central processor 102 may include a central processing unit (CPU), a semiconductor-based microprocessor, a graphics processing unit (GPU), other hardware devices suitable for retrieval and execution of instructions that may be stored on in memory. Additionally, central processor 102 may include a single processor, multiple processors, a single computer, a network of computers, or any other type of processing device. For example, central processor 102 may include multiple cores on a chip, multiple cores across multiple chips, multiple cores across multiple devices, or combinations thereof. Central processor 102 may include at least one integrated circuit (IC), other control logic, other electronic circuits, or combinations thereof that include a number of electronic components.

Coprocessors 104 are computer processors that may be used to supplement the functions of central processor 102. In an embodiment, coprocessors 104 may perform operations such as graphics, signal processing, encryption, input/output (I/O) interfacing with peripheral devices, floating point arithmetic, string processing, etc. Coprocessors 104 may not manage memory, retrieve instructions from memory, execute program control instructions, etc. Thus, in an embodiment, central processor 102 may retrieve instructions from memory for coprocessors 104 to execute.

Coprocessors 104 may include a semiconductor-based microprocessor, a graphics processing unit (GPU), other hardware devices suitable for execution of instructions that may be stored on in memory and retrieved by central processor 102. Additionally, coprocessors 104 may include a single processor, multiple processors, a single computer, a network of computers, or any other type of processing device. For example, coprocessors 104 may include multiple cores on a chip, multiple cores across multiple chips, multiple cores across multiple devices, or combinations thereof. Coprocessors 104 may include at least one integrated circuit (IC), other control logic, other electronic circuits, or combinations thereof that include a number of electronic components. Although multiple coprocessors 104 are depicted in FIG. 1, any number of coprocessors may be utilized, including one coprocessor 104a.

Figure 2:
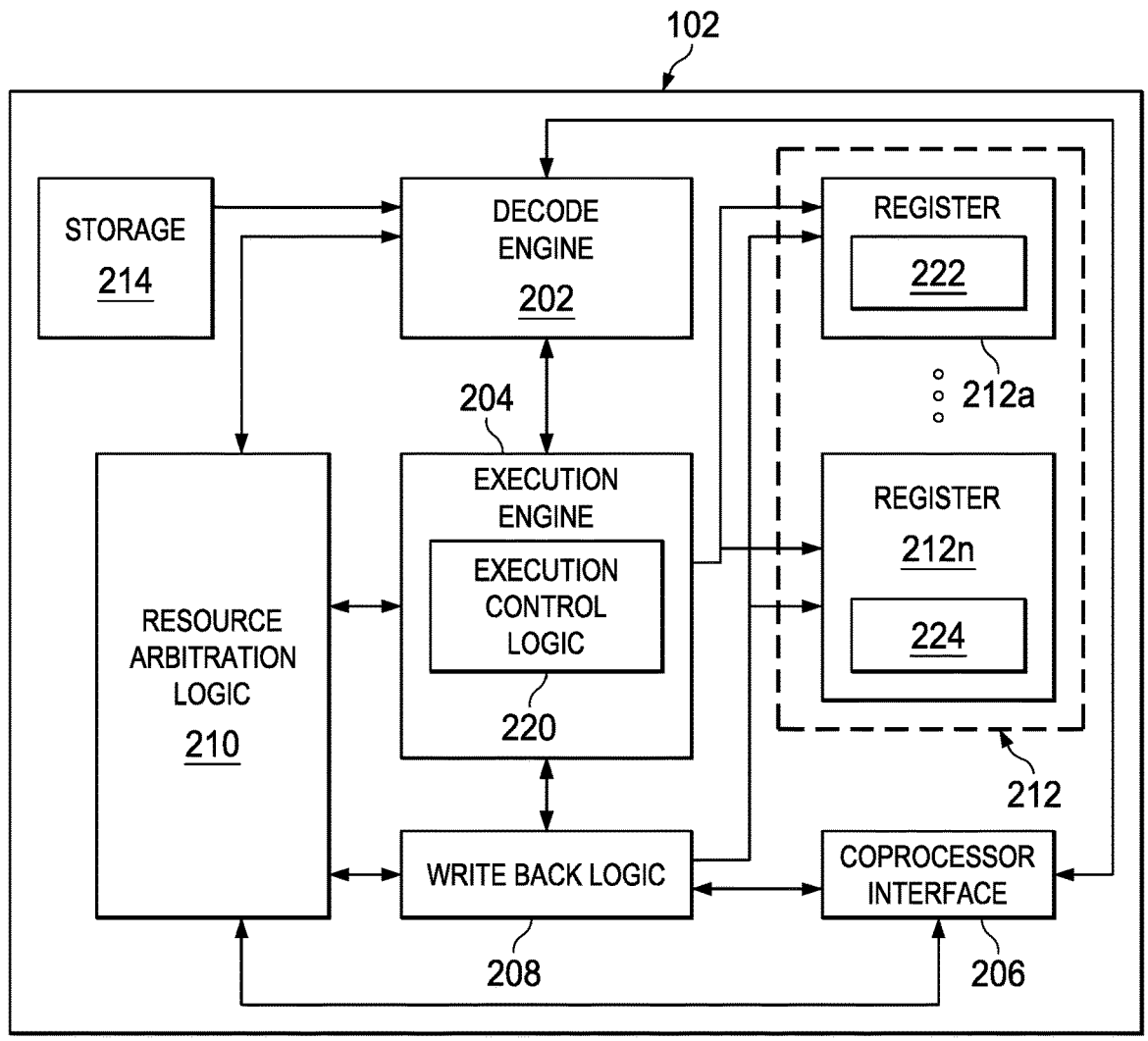
FIG. 2 shows a block diagram of an illustrative central processor to synchronize with one or more coprocessors in accordance with various embodiments.

FIG. 2 shows a block diagram of central processor 102 which may be synchronized with one or more of coprocessors 104 in accordance with various embodiments. Central processor 102 may include decode engine 202, execution engine 204, coprocessor interface 206, write back logic 208, resource arbitration logic 210, registers 212 (e.g. 212a-212n) each containing register tags (e.g. register tag 222 for register 212a and register tag 224 for register 212n), and storage 214. Storage 214 may be any electronic, magnetic, optical, or other physical storage device that contains or stores executable instructions. Thus, storage 214 may be, for example, Random Access Memory (RAM), an Electrically Erasable Programmable Read-Only Memory (EEPROM), a storage drive, a Compact Disc Read Only Memory (CD-ROM), and the like.

Decode engine 202 may retrieve (i.e. fetch) instructions stored in storage 214 that are set to be executed by at least one of coprocessors 104. Decode engine 202 may also extract from the instructions a command instruction, an identity of a destination register, and other parameters. The command instruction provides the task that the coprocessor 104a must execute. While the below description refers to coprocessor 104a, any of coprocessors 104 may execute the command instruction, including more than one of coprocessors 104. The destination register, sometimes referred to as a pointer, is one or more of registers 212 in which the result of the execution of the command instruction is placed. In some embodiments, and in the following examples, the destination register is register 212a. However, any of registers 212 may serve as the destination register including a combination of multiple of registers 212. Decode engine 204 may also set a register tag 222 for destination register 212a at the time the instructions to be executed by coprocessor 104a are decoded and/or extracted. The register tag 222 may, in some embodiments, be a dedicated register tag bit.

Decode engine 202 may also retrieve instructions stored in storage 214 that are set to be executed by central processor 102. In an embodiment, these instructions may require the result from the execution of the instructions by coprocessor 104a. Thus, the instructions executed by central processor 102, at some point, may require central processor 102 to read from destination register 212a to retrieve the result of the coprocessor 104a executed instructions.

Execution engine 204 executes any instructions that are intended to be executed by central processor 102. Execution engine 204 may include different calculation units such as adders or multipliers as well as execution control logic 220. Execution engine 204 may read from and write to any of registers 212 through write back logic 208, including destination register 212a.

In an embodiment, the result of the coprocessor 104a executed command instruction may be required by the central processor 102's execution engine 204 executed instructions, and/or the executed engine 204 instructions may require reading from or writing to destination register 212a. In this embodiment, execution control logic 220 may stall execution of the instructions being executed by execution engine 204 until the result of the coprocessor 104a executed command instruction is written into destination register 212a and the register tag 222 has been cleared by write back logic 208. In order to determine whether the result of the coprocessor 104a executed command instruction is written into destination register 212a, execution control logic 220 may determine whether the register tag 222 for destination register 212a is set or cleared. If the register tag 222 for destination register 212a is set, then the result of the coprocessor 104a executed command instruction has not yet been written into destination register 212a and the central processor 102 is stalled. However, if and when the register tag 222 for destination register 212a is cleared after previously being set, then the result of the coprocessor 104a executed command instruction has been written into destination register 212a. Once the result of the coprocessor 104a executed command instruction 104a has been written into destination register 212a and the register tag 222 cleared, execution control logic 220 may cause execution engine 204 to resume executing its instructions.

Coprocessor interface 206 is capable of interfacing with coprocessor 104, including coprocessor 104a. Thus, coprocessor interface 206 may send instructions that are to be executed by coprocessor 104a, including the command instruction and the identity of dedicated register 212a, to coprocessor 104a and receive the result of the executed command instruction from coprocessor 104a.

Write back logic 208 is coupled to registers 212, including destination register 212a and may write to registers 212, including destination register 212a. Write back logic 208 is also coupled to coprocessor interface 206 and may receive the result of the coprocessor 104a executed command instruction from the coprocessor interface 206. In an embodiment, write back logic 208 writes back the result of the coprocessor 104a executed command instruction into the destination register 212a. Once the result of the coprocessor 104a executed command instruction is written into destination register 212a, write back logic 208 may clear the register tag 222 in the destination register 212a. Furthermore, as write back logic 208 is also coupled to execution engine 208, in an embodiment, write operations to registers 212 are performed by write back logic 208 for instructions executed by execution engine 204 as well.

Resource arbitration logic 210 allocates the resources of central processor 102. In an embodiment, execution control logic 220, which may be coupled to resource arbitration logic 210, makes a request to resource arbitration logic 210 to utilize write back logic 208 to write to at least one of registers 212, except destination register 212a, for instructions executed by execution engine 204. Additionally, coprocessor interface 206, which also may be coupled to resource arbitration logic 210, may request permission from resource arbitration logic 210 to utilize write back logic 208 to write to destination register 212a the result of coprocessor 104a executed instructions, which is received by write back logic 208 from coprocessor interface 206.

In an embodiment, resource arbitration logic 210 allocates resources such that requests by execution logic 220 to utilize write back logic 208 for permission to write to at least one of registers 212, but not destination register 212a, for instructions executed by execution engine 204 are prioritized over requests from coprocessor interface 206 to utilize write back logic 208 to write to destination register 212a the result of the coprocessor 104a executed command instruction. In other words, resource arbitration logic 210 prioritizes execution of instructions by execution engine 204 of central processor 102 over writing the result of the coprocessor 104a executed command instruction.

However, if execution control logic 220, in execution engine 204, has stalled execution of instructions in execution engine 204 because those instructions require reading from or writing to destination register 212a and/or require the result of the coprocessor 104a executed command instruction, execution control logic 220 will not have any pending requests to resource arbitration logic 210 to utilize write back logic 208 to write to registers 212 for instructions executed by execution engine 204. Thus, in this embodiment, resource arbitration logic 210 allocates resources such that write back logic 208 writes the result of the coprocessor 104a executed command instruction to destination register 212a and clears the register tag 222 from destination register 212a. At this point, execution control logic 220 may cause execution logic 204 to resume executing its instructions.

While the above example discusses the execution of one set of instructions by one of coprocessors 104, multiple sets of instructions may be executed by multiple coprocessors 104 in a similar manner and in parallel to one another. Similarly, the result of the coprocessor 104a executed command instruction may be written into destination register 212a, and may also be written into any number of additional registers 212. Thus, the result of the coprocessor 104a executed command instruction may be written into more than a single register (i.e. may be written into a plurality of registers).

Figure 3:
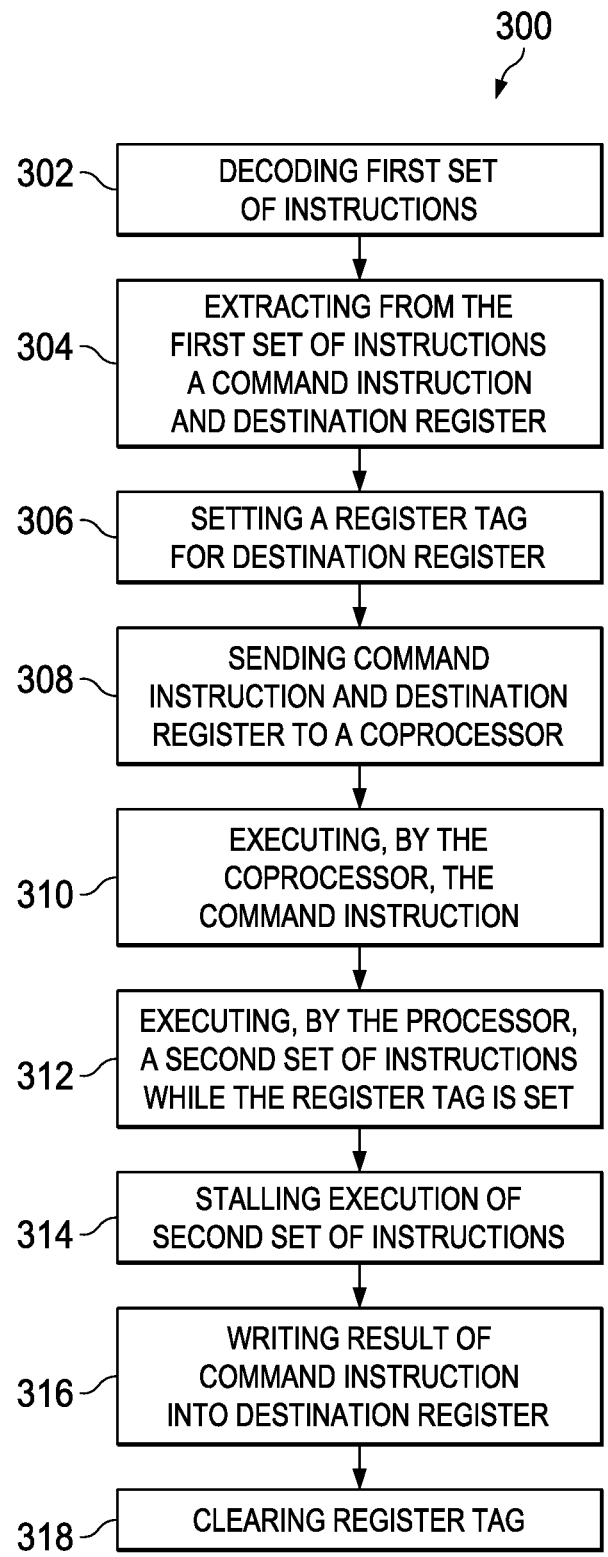
FIG. 3 shows a flow diagram of central processor-coprocessor synchronization method in accordance with various embodiments.

FIG. 3 shows a flow diagram of central processor-coprocessor synchronization method 300 in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 300, as well as other operations described herein, can be performed by central processor 102 and coprocessors 104 and implemented by a processor executing instructions stored in a non-transitory computer readable storage medium.

The method begins in block 302 with decoding, by decoding engine 202 in central processor 102, a first set of instructions. In an embodiment, the first set of instructions are instructions that coprocessor 104a is intended to execute. The first set of instructions may include a command instruction and an identity of a destination register to store the executed result of the command instruction. In block 304, method 300 continues with extracting, by decoding engine 202 in central processor 102, from the first set of instructions the command instruction and the identity of the destination register 212a. In block 306, method 300 continues with setting, by decoding engine 202 in central processor 102, a register tag 222 for destination register 212a.

In block 308, method 300 continues with sending, by coprocessor interface 206 in central processor 102, the command instruction and the identity of destination register 212a to coprocessor 104a. In block 310, method 300 continues with executing, by coprocessor 104a, the command instruction. In block 312, method 300 continues with executing, by execution engine 204 in central processor 102, a second set of instructions while the register tag 222 for destination register 212a is set. In an embodiment, the second set of instructions do not request reading from or writing to destination register 212a or the result of the coprocessor 104a executed command instruction. Thus, central processor 102 may be executing the second set of instructions at the same time that coprocessor 104a may be executing different instructions.

In block 314, method 300 continues with stalling, by execution control logic 220, execution of a second set of instructions based on the register tag 222 being set for destination register 212a. In this embodiment, the second set of instructions depends on the result of the coprocessor 104a executed command instruction and/or requests reading from or writing to destination register 212a while the register tag 222 is set. In this embodiment, execution engine 204 may continue to execute the second set of instructions until those instructions depend on the result of the coprocessor 104a executed command instruction and/or request reading from or writing to destination register 212a at which point, the execution of the second set of instructions by execution engine 204 in central processor 102 is stalled.

In block 316, method 300 continues with writing the result of the coprocessor 104a executed command instruction into destination register 212a. This may be accomplished utilizing write back logic 208 in central processor 102. In block 318, method 300 continues with clearing the register tag 222 from destination register 212a. This may be accomplished utilizing write back logic 208 in central processor 102 and be performed at the time of the writing the result of the coprocessor 104a executed command instruction into destination register 212a. In an embodiment, once the register tag 222 for destination register 212a is cleared, the execution engine 204 may continue executing the stalled second set of instructions.

While method 300 shows a central processor-coprocessor synchronization method between a central processor and one coprocessor, such as coprocessor 104a, method 300 can include parallel method steps as shown in blocks 302-318 performed by a second coprocessor, such as coprocessor 104n and performed at the same time as method 300 is performed utilizing coprocessor 104a. Thus, central processor 102 may decode a third set of instructions, set a second register tag 224 for a second destination register, such as register 212n, send the command instruction for the third set of instructions and the identity of the second destination register to the coprocessor 104n, execute, by the coprocessor 104n, the command instruction for the third set of instructions, write the result of the command instruction for the third set of instructions into the second destination register 212n, and clear the second register tag 224 at the time of writing the result of the command instruction for the third set of instructions in parallel or in series with the method steps of method 300 as shown in blocks 302-308.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A device, comprising:
a first register associated with a tag;
a processor configured to:
  receive a first instruction including a command and an address associated with the first register;
  set the tag in response to the first instruction; and
  receive a second instruction associated with the address, wherein the processor is configured to stall execution of the second instruction until the tag is cleared;
a coprocessor configured to:
  receive the command and the address;
  process the command to generate a result; and
  provide the result to the processor for the processor to store the result in the first register indicated by the address; and
arbitration logic configured to prioritize between a request by the processor to write to a second register and a request by the coprocessor for the processor to write the result in the first register;
wherein in response to the processor storing the result in the first register, the processor is configured to clear the tag.

2. The device of claim 1, wherein:
the tag is a dedicated register bit.

3. The device of claim 1, further comprising:
a decode engine configured to decode the first instruction to determine the command and the address.

4. The device of claim 1,
wherein the arbitration logic is coupled to the processor and configured to arbitrate between the processor and the coprocessor in response to the processor requesting access to the first register and the coprocessor requesting access to the first register.

5. The device of claim 4, wherein:
in response to the processor requesting access to the first register and the coprocessor requesting access to the second register, the arbitration logic prioritizes access by the processor to the first register over access to the second register by the coprocessor.

6. The device of claim 4, further comprising:
in response to the processor being stalled and the coprocessor requesting access to a second register, the arbitration logic prioritizes access by the coprocessor to the second register.

7. A method, comprising:
stalling, by a processor, execution of a first instruction requesting a value from a first register;
setting, by the processor, a first register tag for the first register;
receiving, by the processor, a first request from a coprocessor for the processor to write the value in the first register;
writing, by the processor, the value in the first register;
clearing, by the processor, the first register tag after the value is written in the first register;
resuming, by the processor, execution of the first instruction, in response to clearing the first register tag; and
prioritizing between the first request and a second request from the processor requesting access to write in a second register.

8. The method of claim 7, further comprising:
requesting, by the processor, access to the second register;
receiving, by the processor, a second request from the coprocessor requesting access to a third register; and
prioritizing, by the processor, the second request.

9. The method of claim 7, wherein:
the processor comprises a plurality of registers and the plurality of registers includes the first register and the second register.

10. The method of claim 7, wherein:
the first instruction includes a command and an address for the first register; and
the processor sends the command and the address for the first register to the coprocessor.

11. The method of claim 10, further comprising:
executing, by the coprocessor, the command to generate the value; and
in response to executing the command, generating, by the coprocessor, the first request for the processor to write the value in the first register.

12. A processor comprising:
a first register;
write back logic coupled to the first register and configured to write a value to the first register in response to receiving a write command and the value;
a coprocessor interface coupled to the write back logic and couplable to a coprocessor, the coprocessor interface configured to receive the write command to write the value to the first register and provide the write command and the value to the write back logic;
an execution engine coupled to the coprocessor interface, the execution engine configured to stall execution of an instruction until the value from the coprocessor is written in the first register; and
resource arbitration logic configured to prioritize between a request by the write back logic to write to a second register, and a request from the coprocessor interface for the write back logic to write the value into the first register.

13. The processor of claim 12, further comprising:
a decode engine configured to retrieve from a memory a first set of instructions and to decode:
a coprocessor command from the first set of instructions, wherein the coprocessor command is configured to be executed on a coprocessor of the processor, and
an address associated with the first register for storing the value resulting from the coprocessor command.

14. The processor of claim 13, wherein:
the decode engine sets a tag in response to decoding the coprocessor command.

15. The processor of claim 12,
wherein the resource arbitration logic configured to prioritize between:
a request by the write back logic to write to the first register, and
a request from the coprocessor interface for the write back logic to write the value into the first register.

16. The processor of claim 12, further comprising:
a plurality of registers including the first register and the second register.

17. The processor of claim 12, further comprises:
a tag associated with the first register.

18. The processor of claim 17, wherein:
the tag is a dedicated register bit.

19. The processor of claim 17, wherein:
the write back logic clears the tag in response to the value being written to the first register.

20. The processor of claim 19, wherein:
the execution engine is configured to resume executing the instruction based on the tag being cleared.

* * * * *